US006753907B1

(12) United States Patent
Sukthankar et al.

(10) Patent No.: US 6,753,907 B1
(45) Date of Patent: Jun. 22, 2004

(54) METHOD AND APPARATUS FOR AUTOMATIC KEYSTONE CORRECTION

(75) Inventors: Rahul Sukthankar, Somerville, MA (US); Robert Stockton, Pittsburgh, PA (US); Matthew Mullin, Pittsburgh, PA (US)

(73) Assignee: Justsystem Corporation, Tokushima (JP)

( * ) Notice: Subject to any disclaimer, the term of this patent is extended or adjusted under 35 U.S.C. 154(b) by 813 days.

(21) Appl. No.: 09/712,599

(22) Filed: Nov. 14, 2000

Related U.S. Application Data

(60) Provisional application No. 60/172,051, filed on Dec. 23, 1999.

(51) Int. Cl.⁷ .............................................. H04N 17/00
(52) U.S. Cl. ...................... 348/222.1; 348/383; 348/745; 348/806; 348/190; 348/191; 348/207.1
(58) Field of Search .......................... 348/180; 382/286, 382/289, 293, 295, 296, 276, 287, 298; 353/69, 121; 345/157, 158; 248/191, 744, 745, 746, 747, 207.99, 207.1, 211.12, 222.1, 806, 383, 190, 333.12

(56) References Cited

U.S. PATENT DOCUMENTS

| | | | |
|---|---|---|---|
| 4,126,386 A | 11/1978 | Fritzler | 352/105 |
| 4,303,316 A | 12/1981 | McElveen | 352/57 |
| 4,420,230 A | 12/1983 | McElveen | 352/43 |
| 5,121,983 A | 6/1992 | Lee | 353/8 |
| 5,125,733 A | 6/1992 | Lee | 353/7 |
| 5,283,602 A | 2/1994 | Kwon | 353/69 |
| 5,321,450 A | 6/1994 | Shapiro et al. | 353/119 |
| 5,329,310 A | 7/1994 | Liljegren et al. | 348/147 |
| 5,331,435 A | 7/1994 | Scott | 358/479 |
| 5,355,188 A | 10/1994 | Biles et al. | 353/69 |
| 5,453,803 A | 9/1995 | Shapiro et al. | 353/119 |
| 5,475,447 A | 12/1995 | Funado | 348/745 |
| 5,502,481 A | 3/1996 | Dentinger et al. | 348/51 |
| 5,548,357 A | 8/1996 | Appel et al. | 353/69 |
| 5,554,858 A | 9/1996 | Costa et al. | 250/559.29 |
| 5,586,818 A | 12/1996 | Lee | 353/101 |
| 5,618,094 A | 4/1997 | Lee | 353/101 |
| 5,664,858 A | 9/1997 | Woo | 353/69 |
| 5,706,062 A | 1/1998 | Stolov | 348/761 |
| 5,723,869 A | 3/1998 | Costa et al. | 250/559.29 |
| 5,752,758 A | 5/1998 | Woo | 353/69 |
| 5,793,340 A | 8/1998 | Morita et al. | 345/7 |
| 5,795,046 A | 8/1998 | Woo | 353/69 |
| 5,933,132 A | * 8/1999 | Marshall et al. | 345/158 |
| 6,034,696 A | * 3/2000 | Childers et al. | 345/619 |
| 6,108,440 A | 8/2000 | Baba et al. | 382/154 |
| 6,191,827 B1 | 2/2001 | Segman et al. | 348/746 |
| 6,222,593 B1 | * 4/2001 | Higurashi et al. | 348/745 |
| 6,483,537 B1 | * 11/2002 | Mayer et al. | 348/180 |
| 6,538,691 B1 | * 3/2003 | Macy et al. | 348/222.1 |
| 6,618,076 B1 | * 9/2003 | Sukthankar et al. | 348/180 |

* cited by examiner

*Primary Examiner*—Vu Le
*Assistant Examiner*—Chriss S. Yoder
(74) *Attorney, Agent, or Firm*—Webb Ziesenheim Logsdon Orkin & Hanson, P.C.

(57) ABSTRACT

The present invention provides automatic correction of any distortions produced when computer projection displays are misaligned with respect to the projection surface (such as keystoning). Although sophisticated LCD projectors now offer partial solutions to this problem, they require specialized hardware and time-consuming manual adjustment. The two key concepts in the present invention are: (1) using an uncalibrated camera to observe the projected image; and (2) the image to be displayed is pre-warped so that the distortions induced by the misaligned projection system will exactly undo the distortion. The result is that an arbitrarily mounted projector (in an unknown orientation) still displays a perfectly aligned and rectilinear image.

30 Claims, 4 Drawing Sheets

METHOD AND APPARATUS FOR AUTOMATIC KEYSTONE CORRECTION

CROSS-REFERENCE TO RELATED APPLICATION

This application claims the benefit of U. S. Provisional Application Serial No. 60/172,051 filed Dec. 23, 1999.

BACKGROUND OF THE INVENTION

1. Field of the Invention

The present invention relates generally to distortion correction systems and, in particular, to the automatic correction of distorted computer projection display images.

2. Description of the Prior Art

Unless a projector is carefully aligned to the projection surface (screen), the resulting image on the screen appears distorted, or "keystoned". In prior art, "keystone" refers specifically to a symmetric, trapezoidal distortion caused by projector pitch misalignment. In this application, the term "keystone" refers to the broader class of distortions caused by any misalignments in projector position or orientation.

Keystoning is undesirable, not only because viewers find this warping to be distracting, but also because the distortion can significantly affect the interpretation of visual information such as graphs, bar charts and technical drawings. This keystoning can be prevented by aligning the projection system's optical axis so that it is perpendicular to the screen and ensuring that the image is not rotated with respect to the screen.

Unfortunately, in many situations, these constraints (particularly the former) create a projected image that is either too small (when the projector is too close to the screen) or badly placed (when the projected image is too close to the floor). In view of these constraints, keystoning is often unavoidable.

Some sophisticated LCD projectors offer manual keystone correction.

Using manual controls, a user is able to adjust the projection system to eliminate distortions caused by vertical misalignment. The prior art only addresses symmetric vertical keystoning caused by projector pitch (where a rectangular source image projects to a trapezoid on the screen). In typical projectors, a pitch of up to ±12° may be rectified and the best systems can correct a pitch up to ±20°. More importantly, the prior art cannot rectify distortions caused by any other misalignments, such as projector yaw or roll.

The prior art requires the user to manually adjust the projection system to eliminate keystoning. This can be time consuming and requires the user to have access to the projector. Manual controls would be particularly limiting if the projector were capable of rectifying a broad class of distortions since the user would be required to simultaneously optimize several parameters.

It is, therefore, an object of the present invention to exceed the prior art limitations of pitch correction. It is another object of the present invention to allow rectification of any distortions due to projector placement and enable users to mount projectors anywhere in the room. It is a further object of the present invention to enable fully automatic adjustment of all parameters. However, if the user wishes to manually refine the process, the present invention also offers an intuitive interactive interface.

SUMMARY OF THE INVENTION

The method of the present invention entails determining a mapping between points in the source image frame and the corresponding points in the viewer image frame; identifying boundaries of the projected image frame within the viewer image frame; computing a possible mapping between the projected image frame and the viewer image frame; inferring a possible mapping from the source image frame to the projected image frame based upon the mappings computed in the previous two steps; determining an optimal placement for the corrected application image within the projected image frame (this is the largest rectangle that is completely contained within the projection of the computer display, i.e., the keystoned quadrilateral); computing a pre-warping transformation based on the previous two steps; pre-warping each application image to correct for keystoning based on the pre-warping transformation; and continuously recalibrating the system if desired (assuming that computational resources are available).

Further, the present invention includes an apparatus that is capable of performing the above-described methodology. In this application, the more general problem of aligning the corrected image to a physical projector screen is discussed. The simpler problem of aligning the corrected image to the camera image can be solved by equating the camera image to the physical screen.

DETAILED DESCRIPTION OF THE PREFERRED EMBODIMENT

Figure 1:
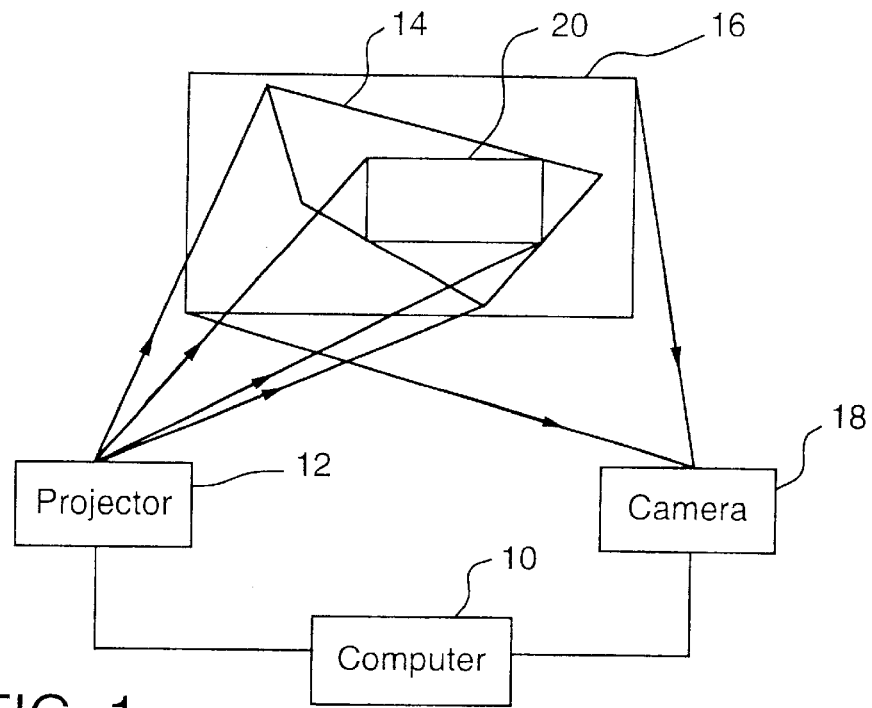
FIG. 1 is, a block diagram of one embodiment of the apparatus according to the present invention.
Figure 4:
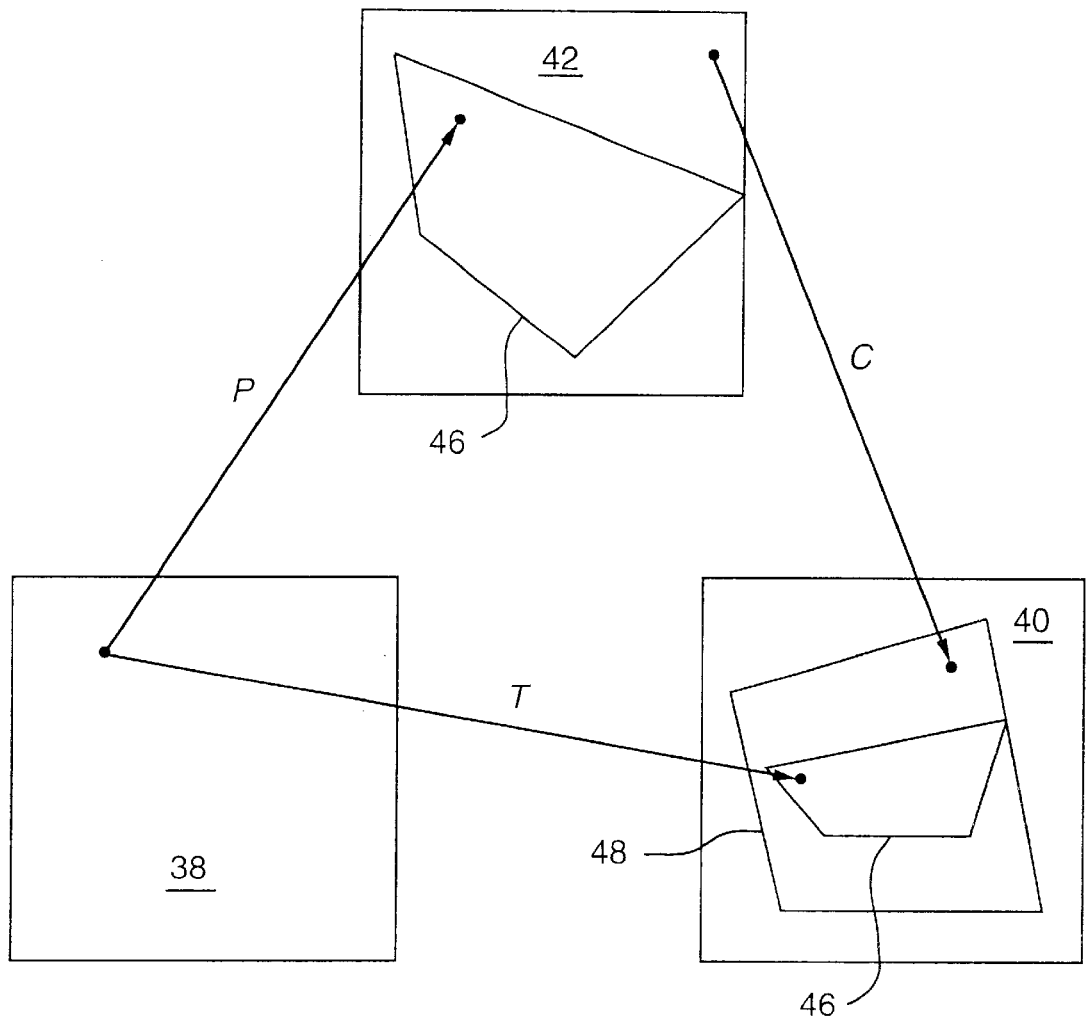
FIG. 4 is an illustration of the relationships between the three frames of reference according to the present invention.
Figure 5:
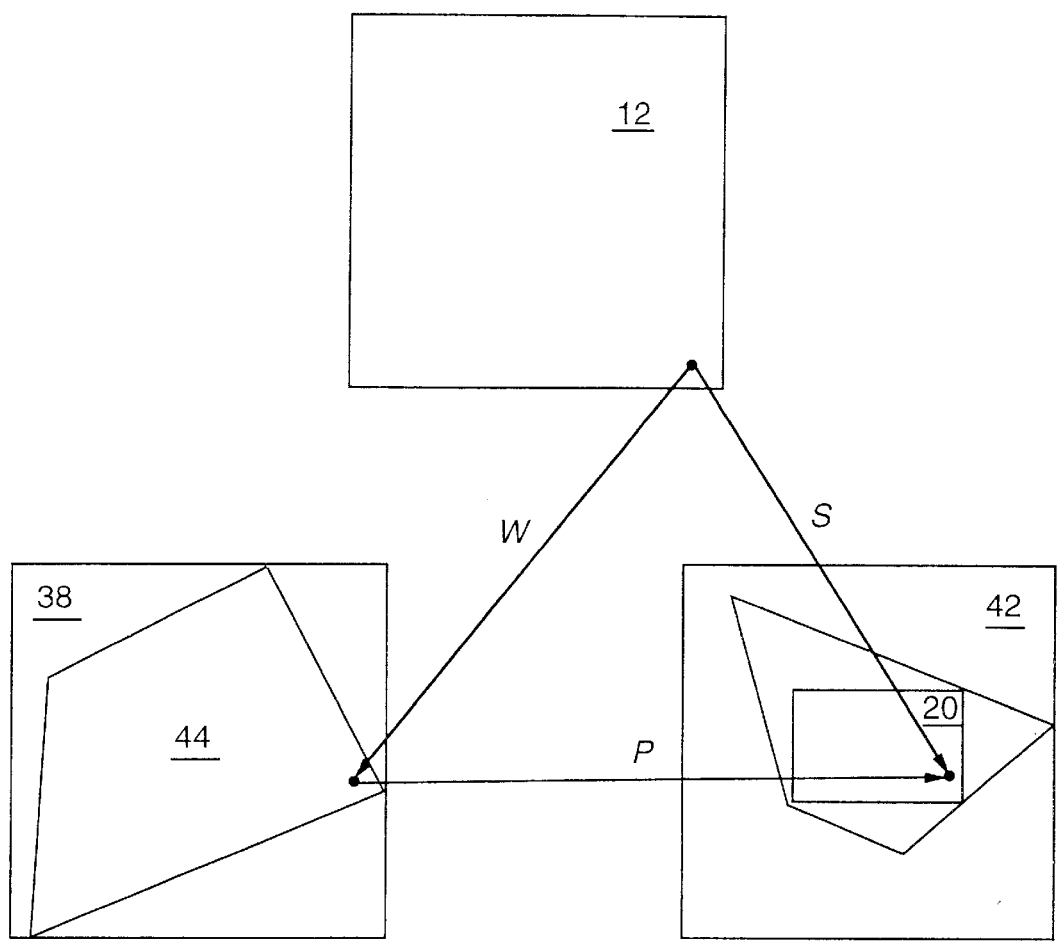
FIG. 5 is an illustration of an appropriately distorted application image using mapping according to the present invention.

According to the present invention, there is provided a method and apparatus for automatically correcting distorted projected images. Referring to FIG. 1, the apparatus includes a computer 10 having a source image frame, a projector 12 in communication with the computer 10 resulting in an application image 14, a projection surface 16 having a projected image frame and a camera 18 having a viewer image frame. Further, as seen in FIGS. 4 and 5, the computer 10 provides a means for determining a mapping T between points in the source image frame and the corresponding points in the viewer image frame, means for identifying the boundaries of the projected image frame within the viewer image frame, means for computing a possible mapping C between the projected image frame and the viewer image frame, means for inferring a possible mapping P from the source image frame to the projected image frame, resulting in a corrected application image 20, means for determining an optimal placement mapping S for the corrected application image 20 within the projected image frame, and means for computing a pre-warping transformation W. The computer 10 may also have a local connected components algorithm as well as standard computer vision algorithms.

Figure 2:
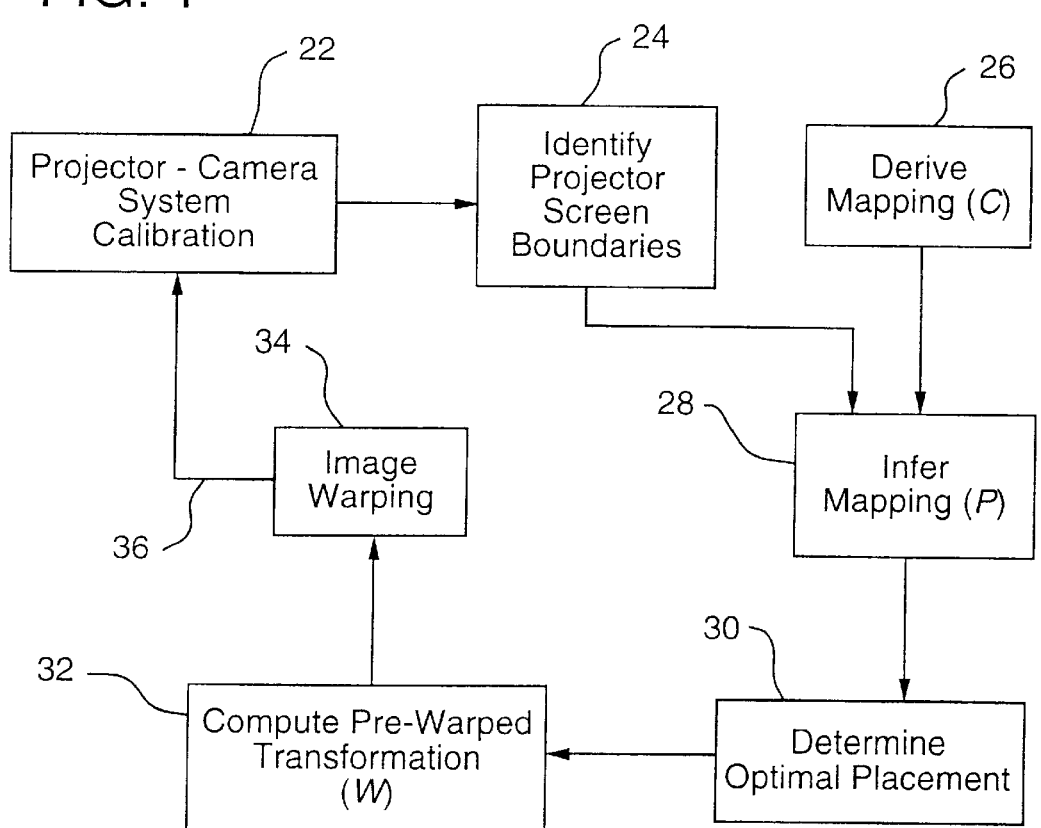
FIG. 2 is a flow diagram illustrating the general method according to the present invention.

As shown in FIG. 2, automatic keystone correction of the present invention is achieved through the steps of: determining the mapping T between points in the source image frame and the corresponding points in a viewer image frame (projector-camera system calibration step 22); identifying the boundaries (typically a quadrilateral) of the projected image frame within the viewer image frame (identifying projector screen boundaries step 24); computing a possible mapping C between the projected image frame and the viewer image frame (derive mapping (C) step 26); inferring a possible mapping P from the results of the source image frame to the projected image frame, based upon steps 24 and 26 (infer mapping (P) step 28), resulting in a corrected application image 20; determining an optimal placement mapping S for the corrected application image 20 within the projected image frame (determine optimal placement step 30); computing a pre-warping transformation W (compute pre-warped transformation (W) step 32), based on P and S, determined in steps 28 and 30; and pre-warping the application image (image warping step 34) based on the pre-warping transformation computed in step 32. In addition, this method may be continuously or periodically repeated (automatic online recalibration step 36).

The two key concepts of the present invention are: (1) the uncalibrated camera 18 is used to observe the display of the computer 10; and (2) the image to be displayed is then pre-warped so that the distortions induced by the projection system will exactly undo the keystone distortion. The result is that the arbitrarily mounted projector 12 (in an unknown orientation) still displays a perfectly aligned and rectilinear image. The projected image may be aligned either with respect to the camera 18 (optimized for a viewer at the camera's location) or with respect to the projection surface 16 that is visible to the camera 18, as shown in FIG. 1. In either case, the method of the present invention process is fully automatic.

The human visual system unconsciously accounts for naturally occurring perspective distortions. Therefore, the juxtaposition of a precisely rectangular image (keystone corrected for a particular viewpoint) on the naturally distorted projection surface seems unnatural. Furthermore, it is impossible to perform keystone correction such that audience members seated in different locations of the room all perceive a perfectly rectangular image (since each location induces a different perspective distortion). While the technical challenges of the latter approach are greater (since the boundaries of the projection surface 16 must be detected in a darkened room), a keystone correction process that aligns images with the projection surface 16 is universally preferred. Therefore, the preferred embodiment of the present invention focuses on the second approach.

The typical hardware requirements for this invention are modest: (1) a standard computer (a prototype was implemented on a Dell Inspiron 7000 laptop); (2) a low-resolution digital camera (e.g., Logitech QuickCam); and (3) a standard LCD projector. The projector 12 can be mounted anywhere as long as the image falls entirely within the projection surface 16 area (e.g., the projector 12 could be placed near the edge of the room, even at an angle). The camera 18 must be mounted such that the projection surface 16 is within its field of view, but the camera 18 can be placed anywhere in a room and need not be level.

Figure 3:
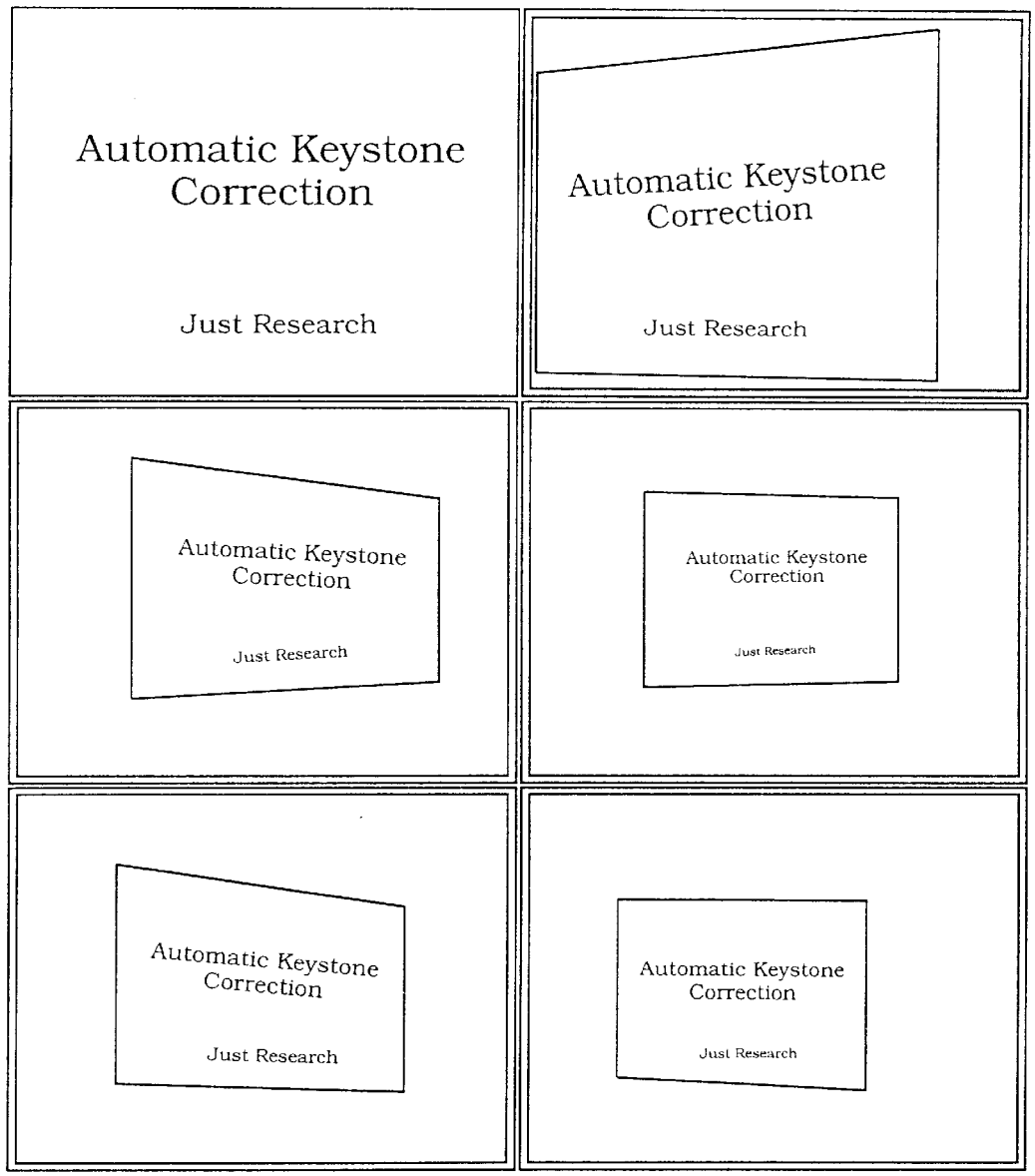
FIG. 3 is a side-by-side comparative view of results from the present invention with typical distortion.

After the apparatus is assembled as described above, the method of the present invention is utilized. The effective results of the present invention are presented in FIG. 3. A rectangular source image (top left) appears distorted when projected from an off-center projector (middle and bottom left). Using the present method, the source image is pre-warped (top right). The resulting projected image is rectilinear and perfectly aligned to the projection screen (middle and bottom right). The middle row of images was captured with a low-quality camera used in the apparatus, and the bottom row of images was captured with a high-quality camera to illustrate how the presentation would appear to an audience member in the room. Each step of the method is described in greater detail below.

As illustrated in FIG. 4, the goal of the projector-camera system calibration step 22 is to determine a mapping between points in an image frame 38 and the corresponding points in a viewer image frame 40 camera image. Calibration of the projector-camera system may be manual, semi-automatic or fully automatic. For manual calibration, the camera 18 and projector 12 are mounted in a known position and orientation, and the internal optical parameters of the components are specified. For semi-automatic calibration, the computer 10 projects an image depicting several calibration regions, and the user manually identifies the locations of these regions in the camera image. From these correspondences, the system automatically computes the above mapping. For the fully automatic calibration, the calibration can be performed without any user interaction. The mapping computed by the calibration process is termed T in the remainder of this document (see FIG. 4).

Next, the identify projector screen boundaries step 24 is performed. The general problem of keystone correction requires pre-warping a source image such that, when projected, its edges will be aligned parallel to the boundaries of the projection surface 16. In a typical case, in which the projection surface 16 is rectangular, the corrected image 20 will also be rectangular. More precisely, the edges of the corrected image 20 should converge toward the same vanishing points as the corresponding edges of the physical screen. To do this, the boundaries of the physical projection surface 16, which is a challenging computer-vision task, must be located. The light from the LCD projector 12 is typically the sole source of illumination, and the screen edges are often difficult to extract under such conditions.

The present invention preferably uses a local connected-components algorithm in which two adjacent pixels are merged if the ratio of their intensities is close to one. Subsequently, all components containing a pixel within a specified distance from the projected source image frame 38 (i.e., the inner quadrilateral 46 in FIG. 4) are merged. The corners of the resulting component (i.e., the outer quadrilateral 48 in FIG. 4) are then extracted with sub-pixel precision using combinations of standard computer vision algorithms. The human user can be offered the opportunity to examine the extracted points and to manually refine the positions if desired. While user feedback is typically unnecessary, the option of user refinement improves reliability in challenging conditions.

Turning to the derive mapping (C) step 26, from the corners found in step 24, and an assumption that the physical surface 16 is rectangular, a mapping C is derived, using standard computer vision techniques, transforming points from a projected image frame 42 to the viewer image frame 40 (within a scale factor). The present invention heuristically estimates the aspect ratio of the physical surface; alternatively, this information may be supplied to the system.

Next, the present invention includes the infer mapping (P) step 28. As shown in FIG. 4, the mapping P from the source image frame 38 to the projected image frame 42 may be computed from the two known mappings T and C, derived above, by composing T with the inverse of C: $P = C^{-1}T$. In this system, P models the configuration of the projector 14 setup that is directly responsible for the keystoning distortion. The task is, therefore, to pre-warp the application image 14 so that it is rectilinear after being mapped through P, creating pre-warped application image 44.

The next step in the method is the determine optimal placement step 30, where the optimal placement of the corrected image is completed. The computer display (source image frame 38) projects to an arbitrary quadrilateral (projected computer display) in the projected image frame 42, as shown in FIG. 5. Since the pre-warped application image 44 can only be displayed within the bounds of the computer 10 display, the corrected image 20 must lie within the bounds of this quadrilateral and (for best viewing) should be as large as possible. This is equivalent to finding the largest rectangle with appropriate aspect ratio within the projected computer display (since it is assumed that the application image is a rectangle). Again, the present invention employs a heuristic optimization that yields satisfactory results.

The next step is the compute pre-warped transformation (W) step 32. Given the desired size and location of the corrected image 20, standard computer vision techniques are used to compute a mapping S that scales and shifts the application image 14 to lie within this area. The necessary pre-warping transformation W is computed from the two known transformations S and P:$W=P^{-1}S$ (see FIG. 5).

Next, the image warping step 34 is performed. The pre-warped image 44 (suitable for projection through an off-center projector 12) is created from the application image 14 using the transformation W calculated above. For each pixel in the pre-warped image 44, the corresponding point in the application image 14 is found by applying the inverse mapping $W^{-1}$. Since the computed point is real valued, it will not typically correspond to a single (integer) pixel in the application image 14. Therefore, several points or pixels in the application image 14 closest to the identified point are blended. In this example, the four pixels in the application image 14 that are closest to this point are blended using bilinear interpolation (a standard computer graphics technique). The application image 14 is embedded in a virtual region of black pixels to ensure that only pixels within the corrected image 20 are illuminated. The image warping computations are well suited to exploit the accelerated 3-D graphics hardware available in typical computers.

The present invention is not limited to digital pre-warping of the application image 14. If the position, location or optical characteristics of the projector can be computer controlled, then the mapping W can be translated into commands to adjust these directly. Similarly, the present invention could also provide instructions to a user for manually adjusting such parameters. A combination of manual and automatic hardware and software distortion correction may result in optimal performance. For instance, the present invention could perform automatic focusing through the hardware interface, followed by fully automatic keystone correction in software and interactive placement of the final corrected image 20.

The final step is the automatic online recalibration step 36. If the application images are suitable for calibration (i.e., either they have several significant point features or have sufficient texture to support an area-based correlation algorithm), and if sufficient computational resources are available on the user's computer during the course of a presentation, then the keystone correction system could perform automatic online recalibration. This would have important benefits. For instance, if the camera 18 or projector 12 were accidentally moved during the course of the presentation, the system would automatically detect the disturbance by observing the discrepancy between expected and observed camera images. The pre-warp transformation W would then be automatically adjusted so that the projected image could remain steady in spite of the motion. In an extreme scenario, one could even envision mounting the camera 18 and/or projector 12 on a moving platform (e.g., such as the user's body) with no adverse effect in the projected image.

Several minor modifications to the general keystone correction method described above are noteworthy. If the apparatus is built such that the camera 18 and projector 12 optics are shared (i.e., the lens is simultaneously used to project and acquire images), the mapping T is simply a known similarity mapping, regardless of the position and orientation of the apparatus with respect to the projection screen 16. Such an apparatus requires no projector-camera system calibration.

If the goal is to correct for keystoning in the camera 18 image (i.e., align the application image to the borders of the viewer image frame 40), one can simply consider the camera image frame 40 to be the projected image frame 42. In other words, C can be the identity mapping and the rest of the method is unchanged. The present invention is also applicable to a setup where the camera 18 observes an undistorted computer 10 display, such as a monitor or LCD screen, and the goal is to correct for the distortions caused by the misaligned camera 18. Further, the present invention may also be used to induce desired keystoning (e.g., for special effects). Given a description of the target quadrilateral (in either projected image or camera image coordinates), one can pre-warp the source image to produce the appropriate effect.

In this manner, the present invention exceeds the prior art limitations of pitch correction. In addition, the above-described apparatus and method of the present invention allow the correction of distortions due to projector placement and allows users to arbitrarily mount projectors anywhere in the room. Further, the present invention is a fully automatic keystone correction system which enables the automatic adjustment of all parameters. Still further, the present invention offers an intuitive interactive interface for manual refinements and adjustments to the process.

The invention itself, both as to its construction and its method of operation, together with the additional objects and advantages thereof, will best be understood from the previous description of specific embodiments when read in connection with the accompanying drawings. Although the specific description of the herein disclosed invention has been described in detail above, it may be appreciated that those skilled in the art may make other modifications and changes in the invention disclosed above without departing from the spirit and scope thereof.

We claim:

1. A computer implemented method for correcting distorted images in a system having a source image frame resulting in an application image, a projected image frame and a viewer image frame, including the steps of:
   (a) determining a mapping T between points in the source image frame and the corresponding points in the viewer image frame;
   (b) identifying boundaries of the projected image frame within the viewer image frame;

(c) computing a possible mapping C between the projected image frame and the viewer image frame;

(d) inferring a possible mapping P from the source image frame to the projected image frame based upon steps (b) and (c), which results in a corrected application image;

(e) determining an optimal placement mapping S for the corrected application image within the projected image frame;

(f) computing a pre-warping transformation W based on mappings P and S; and (g) pre-warping the application image based on the pre-warping transformation W.

2. The method of claim 1 wherein the source image frame is derived from a computer in communication with a projector, the projected image frame is derived from a projection surface and the viewer image frame is derived from a camera.

3. The method of claim 2 further including the steps of:

arbitrarily placing the camera and the projector;

intersecting a camera field of view of the camera with a projector field of projection of the projector on the projection surface;

projecting the application image onto the projection surface;

capturing the application image by the camera;

projecting the corrected application image onto the projection surface; and projecting the pre-warped image onto the projection surface.

4. The method of claim 1 wherein the mapping T between the points in the source image frame and the corresponding points in the viewer image frame is specified manually.

5. The method of claim 1 wherein the mapping T between the points in the source image frame and the corresponding points in the viewer image frame is determined semi-automatically.

6. The method of claim 5 further comprising the steps of:

projecting at least one calibration region into the projected image frame;

manually identifying the calibration region in the viewer image frame; and computing the mapping T.

7. The method of claim 1 wherein the mapping T between points in the source image frame and the corresponding points in the viewer image frame is determined automatically.

8. The method of claim 1 further comprising the steps of:

merging two adjacent pixels within the projected image frame if the ratio of the pixel intensities of the two adjacent pixels is close to one, using a local connected-components algorithm;

merging all components containing a pixel within a specified distance from the projected image frame; and extracting the corners of the resulting component using standard computer vision algorithms.

9. The method of claim 8 further comprising the steps of:

examining the extracted points; and manually refining the positions of the extracted points.

10. The method of claim 8 further comprising the steps of:

transforming points from the projected image frame to the viewer image frame; and deriving the mapping C between the projected image frame and the viewer image frame.

11. The method of claim 1 wherein the mapping P is computed from the general formula:

$$P = C^{-1}T.$$

12. The method of claim 1 wherein pre-warping transformation W is computed from the general formula:

$$W = P^{-1}S.$$

13. The method of claim 1 further comprising the step of:

creating a pre-warped image from the application image.

14. The method of claim 13 further comprising the step of:

identifying corresponding points between the pre-warped image and the application image using an inverse pre-warping transformation $W^{-1}$.

15. The method of claim 14 further comprising the step of:

blending points in the application image closest to the identified point.

16. An image distortion correction system comprising:

a computer having a source image frame resulting in an application image;

a projector in communication with the computer and projecting a projected image onto a projection surface with a projected image frame;

a camera having a viewer image frame;

means for determining the mapping T between points in the source image frame and the corresponding points in the viewer image frame;

means for identifying boundaries of the projected image frame within the viewer image frame;

means for computing a possible mapping C between the projected image frame and the viewer image frame;

means for inferring a possible mapping P from the source image frame to the projected image frame, which results in a corrected application image;

means for determining an optimal placement mapping S for the corrected application image within the projected image frame;

means for computing a pre-warping transformation W based on mappings P and S; and means for pre-warping the application image based on the pre-warping transformation W.

17. The system of claim 16 wherein the camera and projector are arbitrarily placed, a camera field of view of the camera and a projector field of projection of the projector on the projection surface are intersected, the application image is projected onto the projection surface, the application image is captured by the camera, the corrected application image is projected onto the projection surface, and the pre-warped image is projected onto the projection surface.

18. The system of claim 16 wherein at least one calibration region is projected into the projected image frame, the calibration region in the viewer image frame is manually specified, and the mapping T is computed.

19. The system of claim 16 further comprising means for merging two adjacent pixels within the projected image frame if the ratio of the two adjacent pixels is close to one, using a local connected-components algorithm, merging all components containing a pixel within a specified distance from the projected image frame, and extracting the corners of the resulting component using standard computer vision algorithms.

20. The system of claim 19 further comprising means for examining the extracted points, and refining positions of the extracted points.

21. The system of claim 19 further comprising means for transforming points from the projected image frame to the viewer image frame such that a mapping C is derived.

22. The system of claim 16 wherein mapping P is inferred from the general formula:

$$P=C^{-1}T.$$

23. The system of claim 16 wherein the source image frame projects to an arbitrary quadrilateral in the projection image frame.

24. The system of claim 16 wherein pre-warping transformation W is computed from the general formula:

$$W=P^{-1}S.$$

25. The system of claim 16 wherein a pre-warped image is created from the application image.

26. The system of claim 25 further comprising means for identifying corresponding points between a pre-warped image and the application image, using an inverse pre-warping transformation $W^{-1}$.

27. The system of claim 26 further comprising means for blending points in the application image closest to the identified point.

28. The system of claim 16 wherein optics of the projector and optics of the camera are shared such that mapping T is pre-determined.

29. The system of claim 16 wherein a desired distorted image is displayed as the pre-warped application image.

30. The system of claim 16 further including a feedback loop to automatically focus the projector.

\* \* \* \* \*